United States Patent [19]

Moore

[11] Patent Number: 5,632,231
[45] Date of Patent: May 27, 1997

[54] PET SHOWER DEVICE

[76] Inventor: Brian K. Moore, 9907 Orangevale, Spring, Tex. 77379

[21] Appl. No.: 483,821

[22] Filed: Jun. 6, 1995

[51] Int. Cl.$^6$ ............................................. A01K 13/00
[52] U.S. Cl. ............................................. 119/671; 4/567
[58] Field of Search ....................... 4/496, 567–570, 4/615; 119/615–669, 671, 675, 676

[56] References Cited

U.S. PATENT DOCUMENTS

| | | | |
|---|---|---|---|
| 1,760,017 | 5/1930 | Smoot | 119/671 |
| 4,020,796 | 5/1977 | Grifa | 119/671 |
| 4,407,234 | 10/1983 | Kleman | 119/672 |
| 4,505,229 | 3/1985 | Altissimo | 119/158 |
| 5,279,257 | 1/1994 | Temby | 119/676 |

*Primary Examiner*—Charles E. Phillips
*Attorney, Agent, or Firm*—Michael I. Kroll

[57] ABSTRACT

A pet shower device comprising a base sized to receive a body of a pet, with a head of the pet extending outwardly from a front wall of the base. A cover is hinged at one side to the base. When the cover is in a closed position over the base, a front wall of the cover will fit about a neck of the pet. The front wall of the base in combination with the front wall of the cover will have a yoke opening formed thereabout. A structure carried within the base and the cover is for scattering small drops of water on the body of the pet, so as to clean the body of the pet.

1 Claim, 3 Drawing Sheets

PET SHOWER DEVICE

BACKGROUND OF THE INVENTION

1. Field of the Invention

The instant invention relates generally to animal baths and more specifically it relates to a pet shower device.

2. Description of the Prior Art

Numerous animal baths have been provided in prior art that are adapted to wash and clean various animals. While these units may be suitable for the particular purpose to which they address, they would not be as suitable for the purposes of the present invention as heretofore described.

SUMMARY OF THE INVENTION

A primary object of the present invention is to provide a pet shower device that will overcome the shortcomings of the prior art devices.

Another object is to provide a pet shower device that is a self contained bathing system for cleaning dogs and cats without the hassle of a person chasing the pet, holding the pet, getting wet from the bath, being bitten by the pet and getting scratched from the claws of the pet if it is a cat.

An additional object is to provide a pet shower device that will be manufactured in different sizes, so that different sized pets can be baths in the device without any problem.

A further object is to provide a pet shower device that is simple and easy to use.

A still further object is to provide a pet shower device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
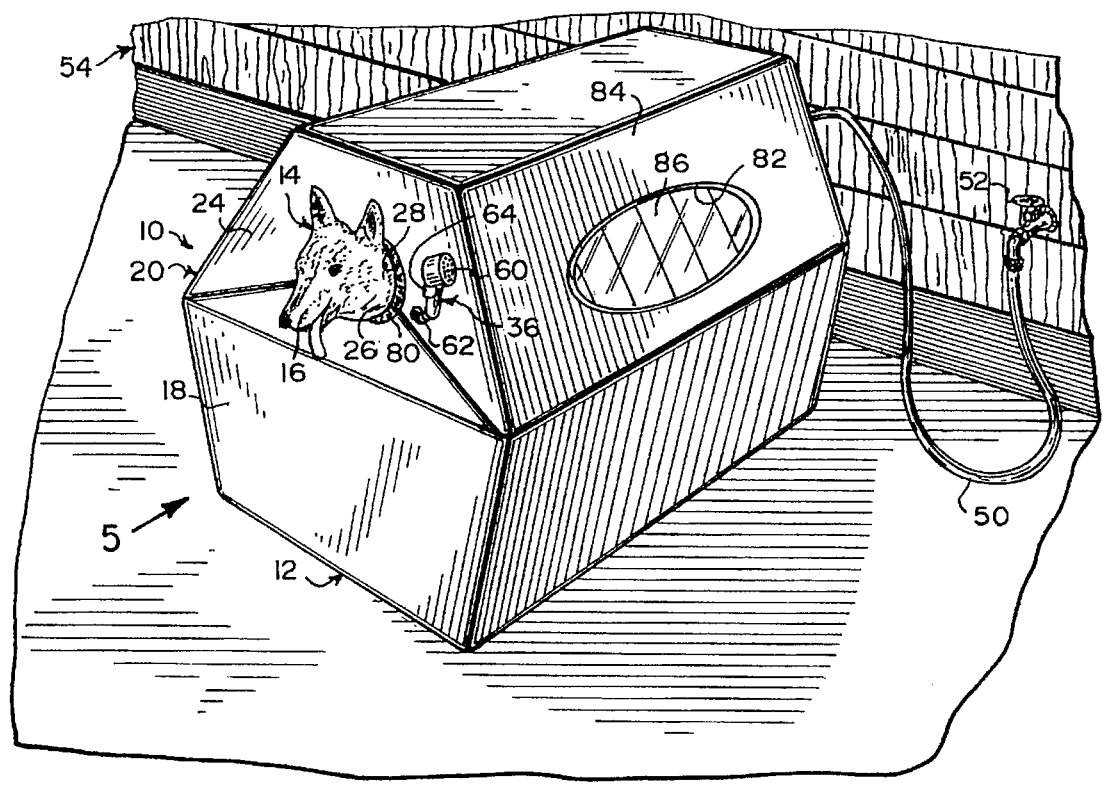
FIG. 1 is a front perspective view of the instant invention in use, with the cover in a closed position over the pet in the base.

Turning now descriptively to the drawings, in which similar reference characters denote similar elements throughout the several views, FIGS. 1 through 5 and 7 illustrate a pet shower device 10, comprising a base 12 sized to receive a body of a pet 14, such as a dog or cat, with a head 16 of the pet 14 extending outwardly from a front wall 18 of the base 12. A cover 20 is hinged at one side 22 to the base 12. When the cover 20 is in a closed position over the base 12, a front wall 24 of the cover 20 will fit about a neck 26 of the pet 14. The front wall 18 of the base 12 in combination with the front wall 24 of the cover 20 will have a yoke opening 28 formed thereabout.

A structure 30 carried within the base 12 and the cover 20, is for scattering small drops of water on the body of the pet 14, so as to clean the body of the pet 14. A component 32 is for connecting the water scattering structure 30 to a supply of water.

An assemblage 34 is fluidly coupled to the water supply connecting component 32, for introducing shampoo and dip into the water scattering structure. A facility 36 is fluidly coupled to the water scattering structure 30, for spraying water, shampoo and dip onto the head 16 of the pet 14, which extends outwardly from the yoke opening 28 in the front wall 18 of the base 12 and the front wall 24 of the cover 20 when in the closed position.

Figure 2:
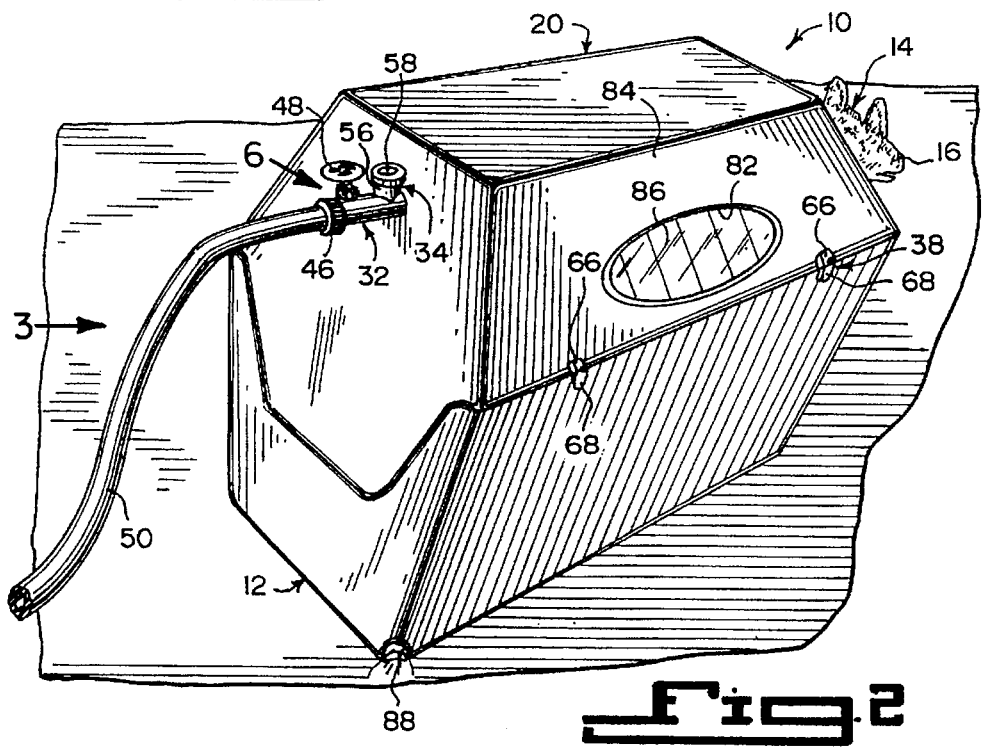
FIG. 2 is a rear perspective view thereof.
Figure 3:
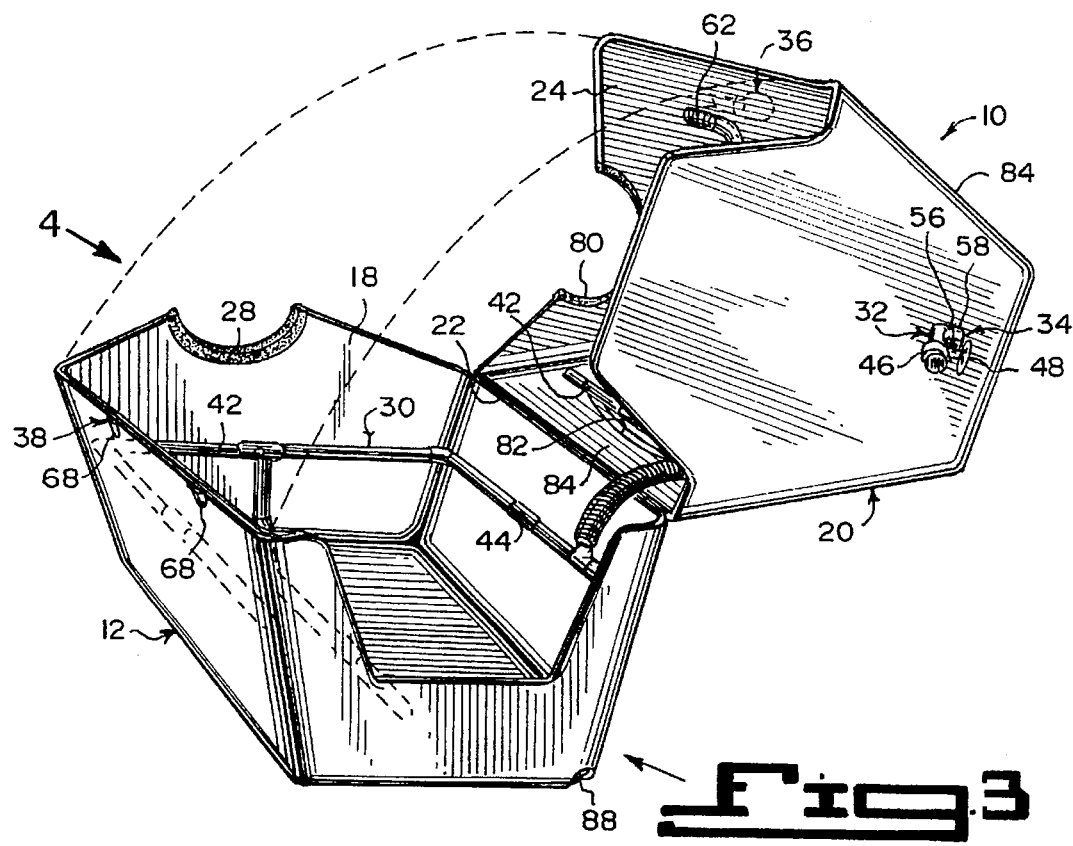
FIG. 3 is a rear perspective view taken in the direction of arrow 3 in FIG. 2 with the cover in the opened position and the pet removed therefrom.
Figure 7:
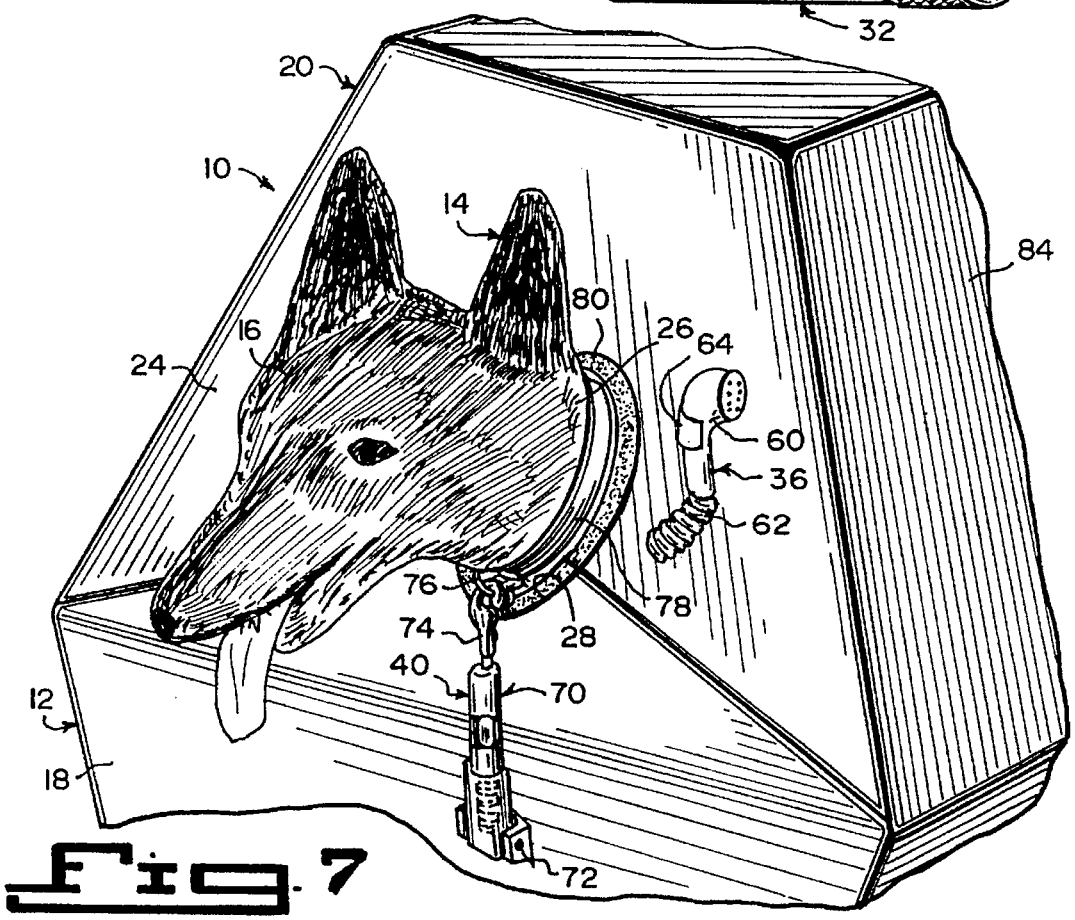
FIG. 7 is an enlarged perspective view with parts broken away, showing the cover in the closed position and the adjustable collar clamp connected to a collar on the neck of the pet.

Paraphernalia 38, as shown in FIGS. 2 and 3, can be installed for retaining the cover 20 to the base 12 in the closed position. An element 40, as shown in FIGS. 5 and 7, can also be provided for holding the neck 26 of the pet 14 stationary when the neck 26 extends through the yoke opening 28 between the front wall 18 of the base 12 and the front wall 24 of the cover 20, when in the closed position over the base 12.

Figure 4:
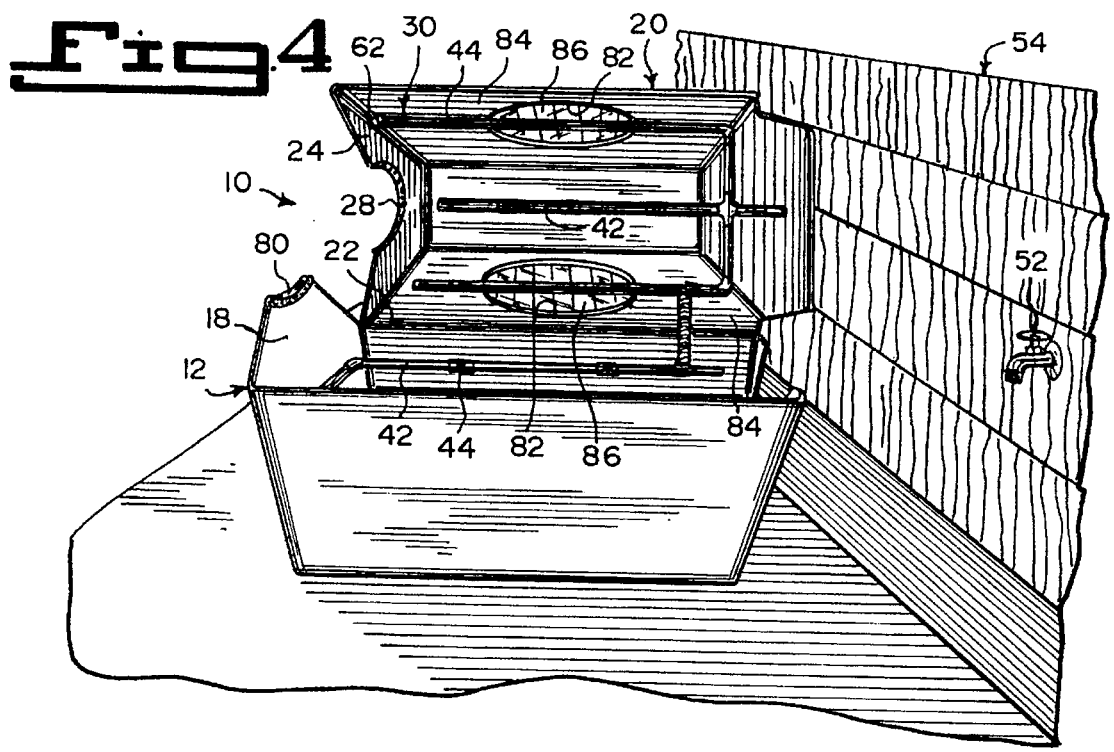
FIG. 4 is a side perspective view taken in the direction of arrow 4 in FIG. 3.
Figure 5:
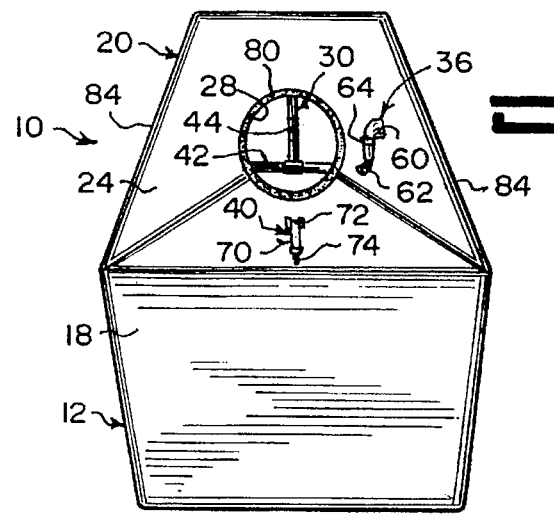
FIG. 5 is a front elevational view taken in the direction of arrow 5 in FIG. 1 with the pet removed therefrom.
Figure 6:
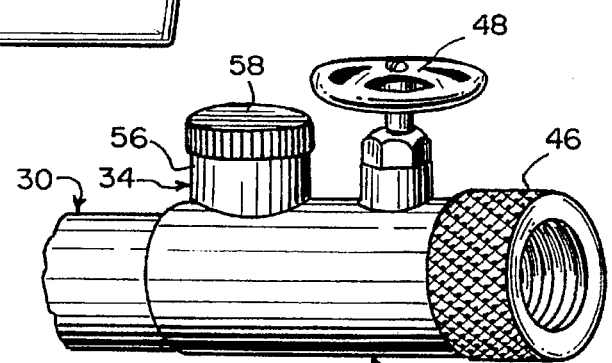
FIG. 6 is a partial perspective view of the water supply connecting component of the instant invention.

The water scattering structure 30 in FIGS. 4 and 5, is a sprinkler assembly 42 having a plurality of jet nozzles 44 directed towards the body of the pet 14. The water supply connecting component 32, as best seen in FIG. 6, is a hose connector 46 with a built-in water valve 48 to engage with a garden hose 50 from an outdoor water faucet 52 on a building 54.

The shampoo and dip introducing assemblage 34 consists of a short pipe 56 extending upwardly from the water supply connecting component 32, so that the shampoo and dip can be disposed into the water scattering structure 30. A cap 58 fits over the short pipe 56 when not in use.

The spraying facility 36 contains a shower head handle 60. A flexible hose 62 fluidly connects the shower head handle 60 to the water scattering structure 30 in the cover 20. A holder 64 is affixed to the front wall 18 of the cover 20, to secure the shower head handle 60 thereto when not in use.

The retaining paraphernalia 38 includes a pair of side lock clamps 66 spaced apart and affixed to the cover 20 opposite from the hinged side 22. A pair of side clamp connectors 68 are spaced apart and affixed to the base 12 opposite the hinged side 22. When the cover 20 is placed in the closed position, the side lock clamps 66 will engage with the side clamp connectors 68, to keep the cover 20 down in the closed position and prevent the pet 14 from exiting therefrom.

The holding element 40 is an adjustable collar clamp 70, pivotally attached at a first end 72 to the front wall 18 of the base 12 below the yoke opening 28. A second end 74 of the adjustable collar clamp 70, which is a clip, can extend up and engage with a loop 76 on a collar 78 of the pet 14, when the head 16 of the pet 14 extends outwardly therefrom. A padded split ring liner 80 extends about the yoke opening 28, so that the neck 26 of the pet 14 will fit comfortably through the yoke opening 28 when the cover 20 is in the closed position.

The cover 20 has a pair of windows 82, in which each window 82 is formed through one side wall 84 thereof. A pair of transparent water reflectors 86 are provided. Each reflector 86 is mounted in one window 82. When the cover 20 is down in the closed position, a person can look through the reflectors 86 and see the water, shampoo and dip being deposited upon the body of the pet 14.

The base 12 has a drain hole 88. Water from the water scattering structure 36 will exit the base 12 through the drain hole 88, thereby preventing the water from accumulating in the base 12.

LIST OF REFERENCE NUMBERS 10 pet shower device
12 base of 10
14 pet
16 head of 14
18 front wall of 12
20 cover of 10
22 hinge
24 front wall of 20
26 neck of 14
28 yoke opening in 18 and 24
30 water scattering structure in 12 and 20
32 water supply connecting component for 30
34 shampoo and dip introducing assemblage on 32
36 spraying facility
38 retaining paraphernalia
40 holding element
42 sprinkler assembly for 30
44 jet nozzle in 42
46 hose connector
48 water valve in 46
50 garden hose
52 outdoor water faucet on 54
54 building
56 short pipe of 34
58 cap of 34
60 shower head handle of 36
62 flexible hose of 36
64 holder for 60
66 side lock clamp on 20
68 side clamp connector on 12
70 adjustable collar clamp for 40
72 first end of 70
74 second end of 70
76 loop on 78
78 collar on 14
80 padded split ring liner in 28
82 window in 84
84 side wall of 20
86 transparent water reflector in 82
88 drain hole in 12

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A pet shower device comprising:
   a) a base sized to receive a body of a pet, with a head of the pet extending outwardly from a front wall of said base, said base having a drain hole;
   b) a cover with side walls hinged at one side to said base, so that when said cover is in a closed position over said base, a front wall of said cover will fit about a neck of the pet in which said front wall of said base in combination with said front wall of said cover will have a yoke opening formed thereabout, said opening having a padded split ring liner for providing a comfortable restraint of the pet, said base having a rear wall with a predominantly vertically extending passageway formed by a bottom and side edges of said rear wall and open at the top, and said cover having a rear wall with an extended portion which closes said passageway when said cover is in a closed position on said base;
   c) means carried within said base and said cover, for scattering small drops of water on the body of the pet, so at to clean the body of the pet comprising a sprinkler assembly having a plurality of pipes containing jet nozzles mounted on the interior walls of both the base and cover directed towards top and sides of the body of the pet;
   d) means mounted on the rear wall of said cover for connecting said water scattering means to a supply of water comprising a hose connector with a built-in water valve to engage a garden hose from an outdoor water faucet on a building;
   e) means fluidly coupled to said water supply connecting means for introducing shampoo and dip into said water scattering means comprising a short pipe extending upwardly from said water supply connecting means downstream of and adjacent to said water valve for receiving shampoo and dip to be deposited into said water scattering means and a cap to fit over said short pipe when not in use;
   f) means fluidly coupled to said water scattering means for spraying water, shampoo and dip onto the head of the pet extending outwardly from said yoke opening comprising a shower head handle, a flexible hose passing through said front wall of said cover fluidly connecting said shower head handle to said water scattering means in said cover, and a bolder affixed to said front wall of said cover to secure said shower head handle thereto when not in use;
   g) means for holding the neck of the pet stationary when the neck is extending through said yoke opening comprising an adjustable collar clamp pivotally attached at a first end to said front wall of said base below said yoke opening and a second end extending up and engaging a loop on a collar of the pet;

h) said cover having a window formed in each side wall of said cover and a transparent water reflector mounted in each said window to permit a person when said cover is down in the closed position to look through said reflectors and see the water, shampoo and dip being deposited upon the body of the pet; and i) said retaining means including a pair of side lock clamps spaced apart and affixed to said cover opposite from said hinged side and a pair of side clamp connectors spaced apart and affixed to said base opposite from said hinged side, so that when said cover is placed in the closed position, said side lock clamps will engage with said side clamp connectors to keep said cover down in the closed position and prevent the pet from exiting therefrom.

* * * * *